July 7, 1964
P. E. PFEIFER
3,139,760
VARIABLE-STROKE DRIVE MECHANISM
Filed Nov. 25, 1960
4 Sheets-Sheet 1
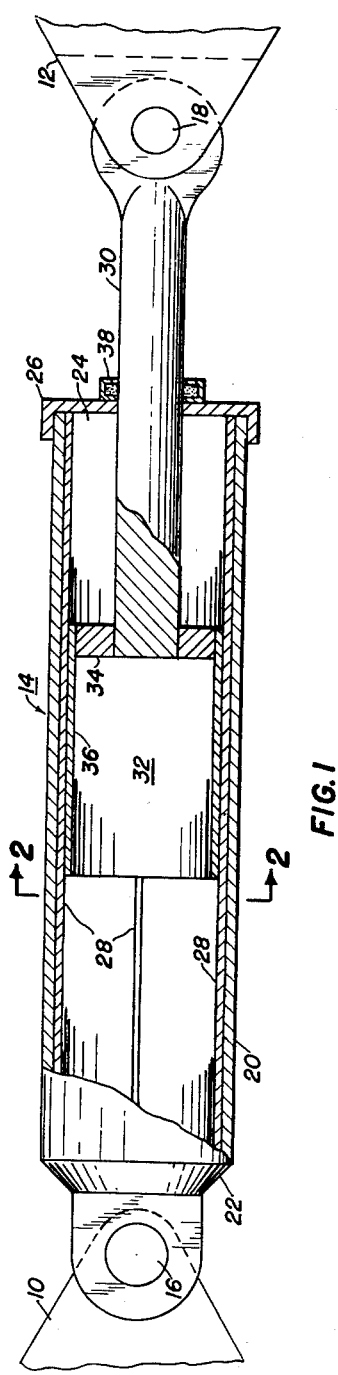
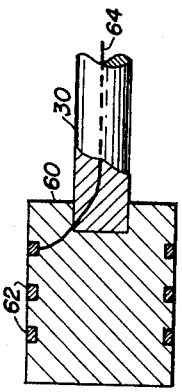
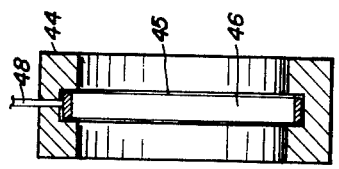
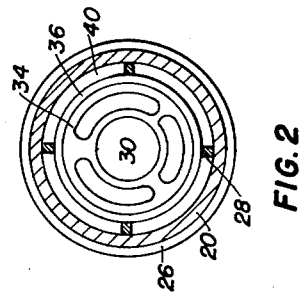
INVENTOR.
BY  PAUL E. PFEIFER
*Edward H. Lang*
ATTORNEY

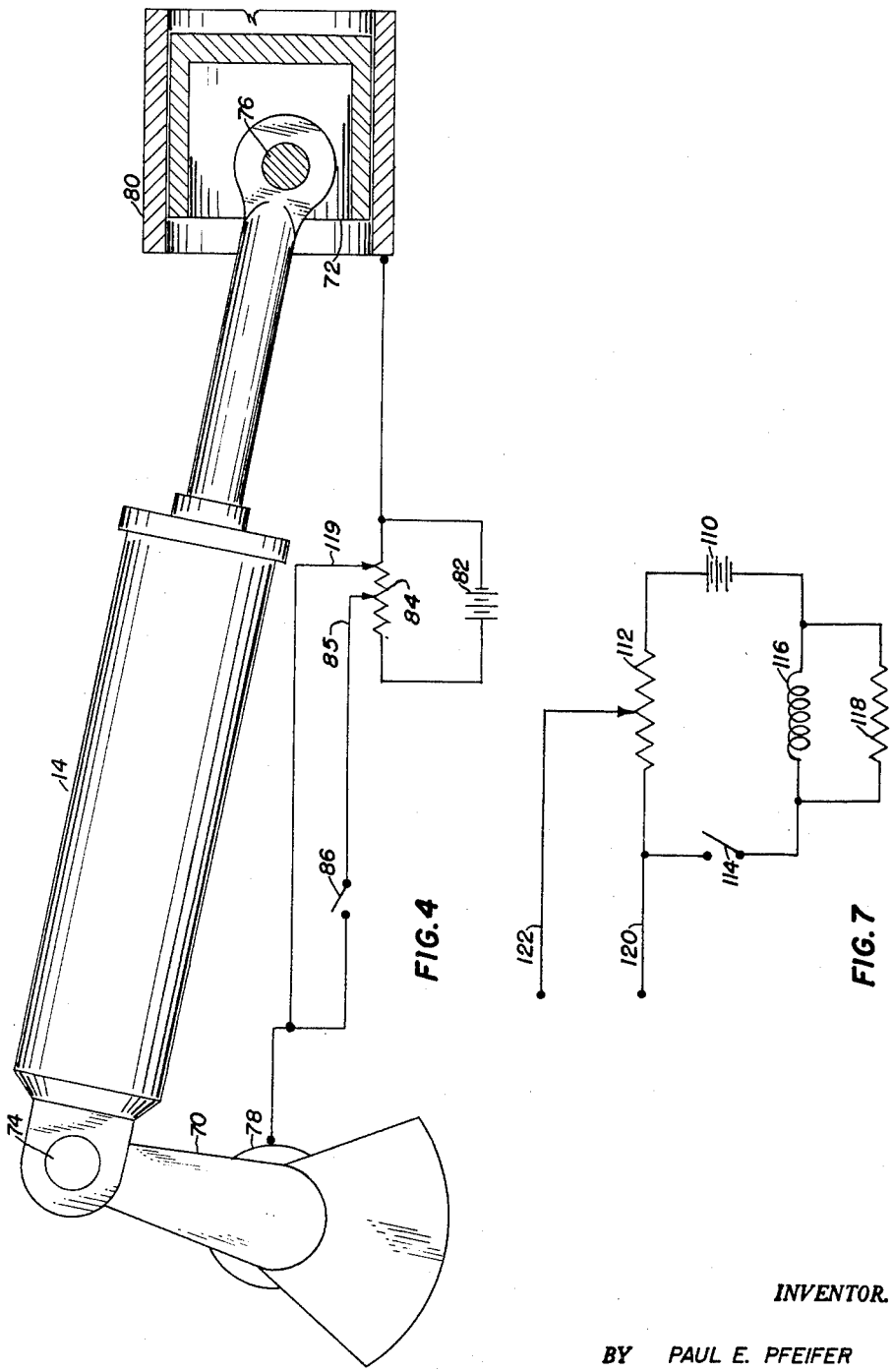

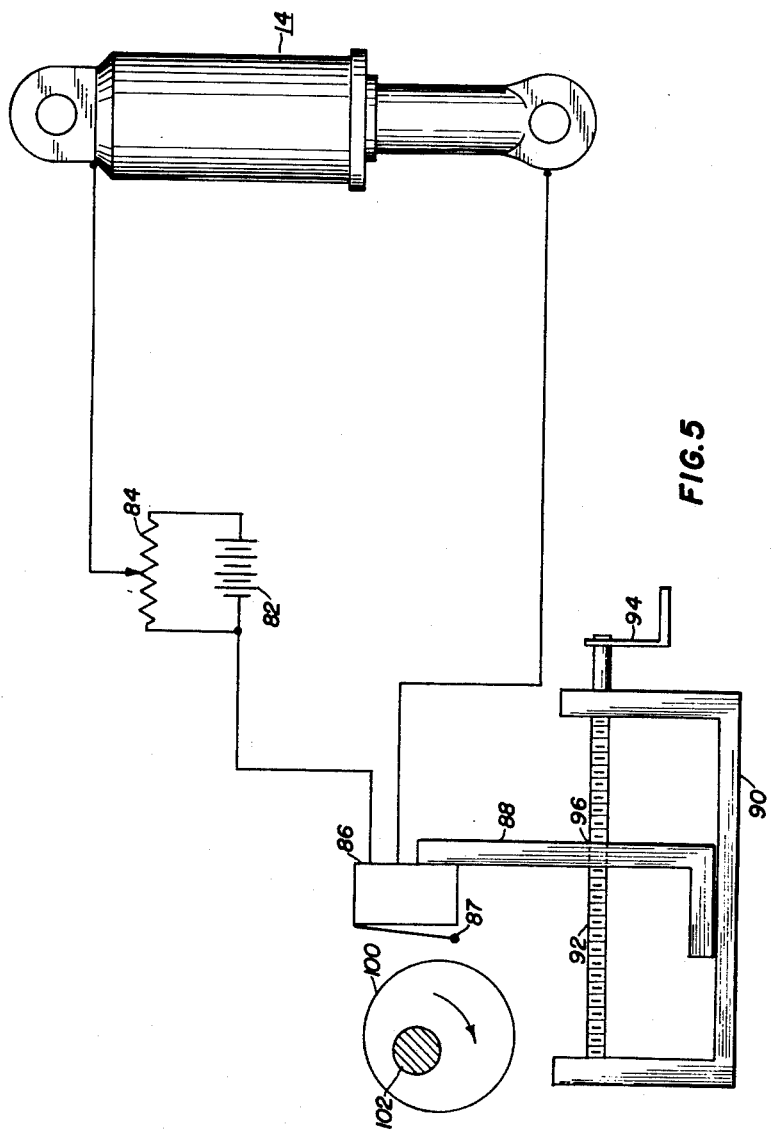

July 7, 1964 P. E. PFEIFER 3,139,760
VARIABLE-STROKE DRIVE MECHANISM
Filed Nov. 25, 1960 4 Sheets-Sheet 4

INVENTOR.
PAUL E. PFEIFER
BY Edward N. Pang
ATTORNEY

United States Patent Office 3,139,760
Patented July 7, 1964

3,139,760
VARIABLE-STROKE DRIVE MECHANISM
Paul E. Pfeifer, Crystal Lake, Ill., assignor to The Pure Oil Company, Chicago, Ill., a corporation of Ohio
Filed Nov. 25, 1960, Ser. No. 71,654
10 Claims. (Cl. 74—44)

This invention is directed to a variable-stroke drive mechanism. More particularly, the invention is directed to an apparatus capable of producing a reciprocative rectilinear motion, the amplitude of which may readily be varied.

In the mechanism of this invention, a reciprocatively-driven machine element, such as the piston of a compressor, is connected to a driving element, such as a crankshaft, or a crosshead driven by a crankshaft and connecting rod, by means of a telescoping coupling in which an electro-fluid or magnetic fluid is retained between adjacent surfaces of the telescoping elements. A field of appropriate kind and density is applied transversely to the film during any desired portion of the cycle of the driving element. This produces a corresponding movement of the driven element during the period in which the field is applied. The field may be interrupted during any desired portion of the cycle of the driving element, thereby breaking the connection between the driving and driven elements.

The properties of electro-fluids and magnetic fluids are well known and understood. Such fluids have the property of becoming substantially rigid in the presence of a suitable field. For example, it has been found that the pressure required to initiate the flow of such fluids through a thin parallel passage of about 0.01 inch can be made to reach values of the order of 50 to 100 p.s.i. per inch of passage length when intense fields are applied normal to the film of fluid.

Fluids suitable for the practice of the present invention may be responsive to electric or magnetic fields, or both. The formulation of such fluids is well known in the art, as exemplified by the patent to Willis M. Winslow, 2,661,596. The composition of and preparation of such fluids does not form a part of this invention. The effect of an applied field manifests itself as an instantaneous and reversible change in the modulus of viscosity of the fluids. In strong fields, the fluid undergoes a dramatic change in shear resistance, and takes on semi-plastic or solid physical properties. The applied field is magnetic and induced by the action of electromagnets in the case of magnetic fluids. Where electro-fluids are used, as is preferred, an electric potential is applied between the adjacent surfaces which bound the fluid film. Electric potentials in the order of 100 to 6,000 volts are contemplated. Since the electro-fluids thmeselves are dielectric, it is understood that the current and power requirements are infinitesimally small.

It is, therefore, an object of this invention to provide a device whereby the amplitude of the stroke of a reciprocating machine element can be varied at will while the machine is in operation. It is another object of this invention to provide an apparatus for transforming rotary motion into reciprocating rectilinear motion of variable amplitude.

The invention is best described with reference to the drawings of which:

FIGURE 1 is a frontal view, partially in section, of an electro-fluid linkage which comprises a portion of the apparatus of this invention.

FIGURE 2 is a view in the direction 2—2 of FIGURE 1.

FIGURE 3 is a sectional view of a plunger and rod assembly which may be used in conjunction with the device of FIGURE 1, when magnetic fluids are employed.

FIGURE 4 is a view of a complete apparatus for transforming rotary motion into reciprocative rectilinear motion of variable amplitude.

FIGURE 5 is a view of an electric control device which may be used in conjunction with the apparatus of FIGURE 4.

FIGURE 6 shows a novel fluid seal which may be used in the apparatus depicted in FIGURE 1.

FIGURE 7 is a diagram of an electric circuit which may be used to control the device of FIGURE 4.

Figure 8:
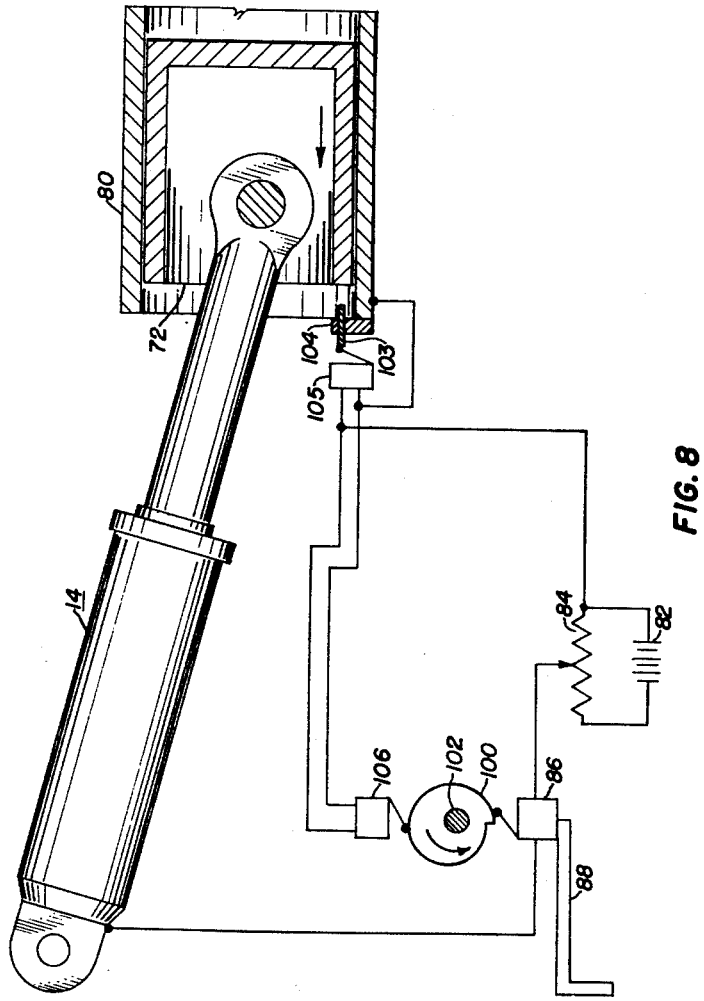
FIGURE 8 is a view of a complete apparatus, such as that of FIGURE 4, modified to insure return of the piston to the bottom position.

Referring to FIGURE 1, driving member 10 and driven member 12, both of which are capable of moving with a reciprocative motion, are pinned to connecting-link assembly 14 by pins 16 and 18. Tube 20 comprises the body of the connecting-link assembly, and includes a closed end 22 and an open end 24, which open end is partially closed by cover plate 26. Within tube 20 are disposed four longitudinal stringer-like guides 28 which are small in radial thickness, preferably being not more than 0.010 inch in radial thickness. Lying axially in tube 20 is rod 30 which at one end connects to pin 18, and at the other end is secured to plunger 32. Plunger 32 consists of a support portion 34 and a tube portion 36. The tube portion fits closely within the guides 28 and is thereby guided and supported for axial movement of the rod and plunger assembly with respect to tube 20.

Tube 20 is preferably made of steel, but may be fabricated of other electrically conductive materials. At least the tubular portion 36 of the plunger 32 is made of an electrically conductive material, but preferably the whole plunger assembly, including rod 30, is fabricated of steel. The stringer-like guides 28 are made of an electrically insulating material, which should also be resistant to wear. Hard plastic materials, such as Bakelite, may be used for this purpose. A thin film of an electro-fluid is maintained in the space between plunger 32 and tube 20. The electro-fluid has a low viscosity when not under the influence of an applied electric field, so that axial movement of the rod and plunger assembly with respect to the tube 20 is impeded only by the viscosity of the electro-fluid. Preferably, the entire interior of tube 20 should be filled with the electro-fluid. Seal 38 is made of an electrically insulating sealant material, such as a synthetic elastomer, and serves to retain the electro-fluid within the tube and permit free movement of rod 30. It is evident that when an electric field is applied transversely to the electro-fluid film occupying the space between plunger 32 and tube 20, the shear resistance of the electro-fluid increases dramatically, and movement of the rod and plunger assembly with respect to the tube can be accomplished only by the application of great force.

The magnitude of the load which can be carried by connecting-link assembly 14 without substantial movement of the plunger relative to the tube depends upon the properties of the electro-fluid used, the magnitude of the applied electrical field, and the distance between the plunger and the tube interior. The electric field is most conveniently applied by connecting one terminal of a direct potential source to driving member 10 (and thereby through pin 16 to tube 20), and the other terminal of the potential source to driven member 12 (and thereby to rod 30 and plunger 32). Suitable electrical insulation must be provided to prevent the connecting-link assembly from being shorted out by the frame of the machine. The magnitude of the applied voltage may be in the order of 100 to 6,000 volts, and is limited only by the dielectric strength of the film of electro-fluid maintained between the tube and plunger.

FIGURE 2 shows an embodiment of the invention in which the supporting portion 34 of plunger 32 is web-like to provide for the free flow of electro-fluid through the supporting portion of the plunger. This construction greatly reduces the residual viscosity effects of the electro-fluid upon the free movement of the plunger when no electric-field is applied. This permits the radial thickness of the annular space 40 to be reduced to an absolute minimum, as little as 0.003 inch. By using such small spacing, the device is capable of carrying high loads without slippage under the influence of an electric field. Alternatively, the support portion 34 of the plunger may be made solid, in which case the distance 40 between the tube and plunger must be increased to permit adequate flow of fluid therebetween so that the plunger can move freely in the absence of an applied electric potential. When an electric potential is applied, very great holding power is nevertheless obtained, because the plunger acts as a piston, trapping the incompressible electro-fluid, and relative movement of the tube and plunger is prevented not only by the bonding achieved between the piston and tube, but also because the electro-fluid is rendered semi-solid and must be displaced through the space 40 to permit movement of the plunger. It is evident that when a plunger adapted to compress the electro-fluid is used, seal 38 must be one of great fluid-retaining capabilities to prevent leakage of electro-fluid from the assembly under high applied pressure. A suitable seal is depicted in FIGURE 6. The seal support 44 is made of an electrically insulating material, fits closely around rod 30, and is firmly fixed to cover plate 26. Within the recess 45 of seal support 44 is disposed a narrow ring 46 which is connected to electrical conductor 48. Electrical conductor 48 may be connected to tube 20. Ring 46 is supported by seal support 44 in spaced relationship with rod 30. The radial space between rod 30 and ring 46 is preferably very small, in the order of about 0.002 of an inch. Electro-fluid tending to leak through the seal is rendered highly rigid under the influence of the electrical potential existing between the ring 46 and the rod 30. In addition, a conventional lip-type seal prevents leakage during that portion of the cycle when link assembly 14 is de-energized. At this time fluid pressure is low. In this manner the leakage of fluid is effectively prevented.

Referring to FIGURE 3, a plunger is shown which may be used with magnetic fluids. Plunger body 60 connects to rod 30, and is made of magnetic iron. A plurality of coils 62 are placed around the periphery of the plunger in slots provided therefore. Electrical connection is made to the coils by conductor 64 and by rod 30 which is electrically connected to the other terminal ends of the coils, which may be placed either in parallel or in series. The coils produce a magnetic flux when energized and thus increase the shear resistance of the magnetic-fluid film disposed between the plunger and tube.

FIGURE 4 shows a complete device for transforming rotary motion into rectilinear reciprocative motion of variable amplitude. Linkage assembly 14, which may be identical with that shown in FIGURE 1, is connected between crank 70 and piston 72 by means of crank pin 74 and wrist pin 76. Crank 70 is supported by bearing 78 and rotates freely within the bearing. Piston 72 is slidably supported in cylinder 80. An electric circuit, which includes a potential source comprising battery 82 and potentiometer 84, is connected through tap 85 and switch 86 to provide an electric field capable of energizing the electro-fluid within linkage 14. Crank 70 may be driven by any suitable engine, and piston 72 may be a piston in a compressor. It will be understood, however, that this is merely an illustrative embodiment of the apparatus of this invention, and that piston 72 could be replaced by a crosshead or other reciprocating member. It is evident that if switch 86 is maintained in the closed position, the stroke of piston 72 will be equal to the throw of the crank, and the location of the points between which the piston reciprocates will be determined by the position of the plunger within the tube of the linkage 14 at the time that the switch is closed. It is further evident that if switch 86 should be moved to the open position at a point in the cycle of the crank, such as 15° before top dead-center, and then moved to the closed position again at another position of the crank, such as 15° after top dead-center, the travel of piston 72 will be decreased by that distance through which the piston would normally travel from 15° before top dead-center to the top-dead-center position. Thus it is evident that the device provides a convenient method for varying the amplitude of reciprocation of the driven piston 72. During the time that switch 86 is in the open position, there is no electric field to energize the electro-fluid, and crank 70 continues to rotate without the application of driving force to the piston.

Conversely, the cycle can be started with switch 86 open at the bottom-dead-center position of crank 70. As the crank rotates toward top dead-center, piston 72 remains fixed, with the motion being taken up by movement of the plunger inside link 14. Piston motion then can be started at any time during the upward movement of the crank by closing switch 86. If the switch were closed at 15° before top dead-center and opened at 15° after top dead-center, the piston motion would correspond to the crank-pin displacement for that portion of the cycle.

Thus switching arrangements can be devised which will cause the motion of the driven member to be centered around either the top-dead-center or bottom-dead-center position of the crank. The choice of the type of operation is governed largely by the cyclic variations in the forces being transmitted by the apparatus.

Battery 82 and potentiometer 84 provide means for adjusting the potential applied transversely to the electro-fluid when switch 86 is in the closed position. Thus the degree of rigidity of linkage 14 can be controlled. The application of reduced voltages renders the linkage less rigid, and this may be desired to avoid the shattering effects of the sudden application of an impact load upon the driving and driven members. For example, if it is desired to reduce the travel of the driven member to half of that of the crank throw, it becomes necessary to open or close switch 86 from 90° before top dead-center to 90° after top dead-center. In order to avoid the application of heavy initial loads at the instant that switch 86 is closed, it may be desirable to adjust tap 85 of potentiometer 84 for less than maximum voltage. The voltage selected should be one which will provide adequate gripping to provide the necessary driving force without substantial slippage, but not one so great as to prevent some slipping and cushioning effect in the linkage upon the sudden application of electric potential.

Alternatively, the circuit of FIGURE 7 may be employed to prevent the application of heavy impact loads. The circuit comprises D.C. power source 110, potentiometer 112, switch 114, and choke coil 116, all of which are serially connected in a closed circuit. Resistor 118 is connected across choke coil 116, and conductors 120 and 122 are provided for connection to the electro-fluid linkage assembly. When switch 114 is closed, choke coil 116 limits the rate at which current flow increases, and hence also the voltage drop across the potentiometer 112. While choke coil 116 is of substantial impedance, its resistance is relatively low, so that when the current reaches equilibrium conditions, substantially all of the voltage drop occurs across potentiometer 112. When the switch opens, the voltage across the potentiometer immediately drops to zero. Resistor 118 provides a current path to speed the collapse of the field about choke coil 116 as the switch opens.

It is further evident that in some instances, for example in the operation of a compressor, it may be desirable to maintain the electro-fluid under the influence of a lesser potential when the switch is in the off position, rather than to reduce the electrical potential to zero. In this manner, it is possible to apply a sufficient field to maintain the piston 72 in place against the force of the gas compressed above the piston during the period that switch 86 is open, and thereby prevent downward movement of the piston under the influence of the compressed gas during this period. This can be readily accomplished by providing a second tap 119 on potentiometer 84, connected directly to bearing 78 to short circuit switch 86. By suitable adjustment of the second tap 119, the voltage applied to the electro-fluid when the switch is in the open and closed positions can be adjusted to produce a desired movement of piston 72. It is evident that analogous circuitry may be employed where magnetic fluids, rather than electro-fluids, are used.

Referring to FIGURE 5, a device for supporting switch 86 and automatically actuating the switch is shown. Linkage 14 is connected between a driving and driven member as shown in FIGURE 4, and the same electric circuit is provided; however, switch 86 is mounted upon an L-shaped support bracket 88, which is in turn supported by base 90. Base 90 further supports threaded shaft 92 which is equipped with handle 94 for rotating the shaft. Threaded shaft 92 extends through support 88 at threaded hole 96, so that rotation of crank 94 produces a lateral movement of support 88 and switch 86. Cam 100 rotates on shaft 102, which shaft may in fact be a portion of crank 70 of FIGURE 4. If shaft 102 is separate from crank 70, it may be driven thereby by means of gearing or a timing belt so that the angular position of cam 100 with respect to crank 70 is maintained constant. It is evident that the position of switch 86, which may be a conventional limit switch, with respect to cam 100 is readily controllable by rotation of crank 94. It is further evident that if the rotation of cam 100 corresponds with the rotation of crank 70, the position of switch 86 will determine the period of the crank cycle during which the electro-fluid is not energized. It is less obvious, but nonetheless true, that if switch 87 is normally closed, the piston motion will be centered around the bottom-dead-center crank position, and if it is normally open, the piston motion will be centered around the top-dead-center crank position. It is at once evident that appropriate switch circuits employing conventional limit switches can be actuated directly by crank 70, or can be actuated by a reciprocating driving member other than a crank. Accordingly, adjustment of the position of the limit switch with respect to the driving member determines the period of the reciprocative cycle during which the electro-fluid is rendered rigid by the influence of an electrical potential, or removed from the influence of said potential.

Referring to FIGURE 8, a modification of the apparatus depicted in FIGURE 4, is presented. It is often desirable to provide positive means for de-energizing linkage 14 at the instant the piston reaches the lower limit of its travel, to prevent damage to the apparatus should the driven member become out of phase with the crank. FIGURE 8 shows a control circuit comprising such means. The following description applies to a system in which the motion of the piston is centered around the top-dead-center position of the crank. An analogous system may be used where it is desired that the travel of the piston, or other driven member, center around the bottom crank position. Control switch 86 is provided to energize and de-energize linkage 14, as cam 100 actuates this switch. Since the motion of piston 72 is to be centered about the top-dead-center position of the crank, switch 86 is of the normally open type. Switch 86 may be supported as shown in FIG. 5 to provide accurate control of the extent of reciprocative movement of piston 72.

The profile of cam 100 is such that for 180° of its travel the lift of the cam gradually increases from a minimum to a maximum value. The second 180° of cam travel is at constant maximum lift and is followed by a sharp drop to zero lift at the 360° position. Cam 100 is so oriented with respect to the crank shaft and switch 86 that the zero lift cam position is opposite the switch 86 cam follower when the crank is in the bottom-dead-center position. In FIGURE 8 the apparatus is depicted as it appears just before the crank reaches bottom-dead-center. A second switch 105, which is normally closed, is connected in series with switch 86 and is actuated by rod 103, which rod is guided by stop 104. It is evident that as piston 72 moves to its lowest position, the bottom of the piston skirt strikes rod 103 and opens normally closed switch 105. Switch 106, which is normally open, is connected in parallel with switch 105, and is positioned to be actuated by cam 100 at a position removed 180° from switch 86. Switch 106 is adjusted such that it is actuated from the normally open to the closed position only when the maximum height of cam 100 contacts the switch 106 cam follower.

The operation of the device of FIGURE 8 can best be explained by considering the cycle beginning when the zero position of cam 100 has just passed the switch 86 cam follower. Normally open switch 106 is actuated to the closed position by the high portion of cam 100. The skirt of piston 72 rests against rod 103 and holds switch 105 in the open poistion. The piston is at the lowest extremity of its travel. As cam 100 rotates, the cam periphery engages the follower of switch 86 at an angle of rotation which is dependent upon the radial position of switch 86, as has been explained with reference to FIGURE 5. At the desired, preselected, angle of cam rotation, say 15° after bottom-dead-center, switch 86 is closed and linkage 14 thereby energized; the circuit being completed through switch 106 which is held in the closed position by cam 100. As the crank continues to rotate, piston 72 moves away from the low extreme position, releasing rod 103 and permitting switch 105 to return to its normally closed position. Continued rotation of the cam through the 180° position with respect to switch 86 maintains switch 86 in the closed position, but permits switch 106 to return to its normally open position. The circuit energizing linkage 14 is nevertheless maintained through normally closed switch 105. Thus the linkage 14 remains energized until the crank has rotated to about the 15° before bottom-dead-center position, at which point the piston skirt strikes rod 103 opening switch 105. Since switches 105 and 106 are now both open, it is evident that linkage 14 is de-energized regardless of whether switch 86 is open or closed. This situation continues until the cam rotates to the zero position (the bottom-dead-center position of the crank), at which time switch 86 drops to the normally open position, and switch 106, which is removed 180° from switch 86, is actuated by cam 100 and closes. Linkage 14, however, remains de-energized until continued rotation of can 100 again closes switch 86 for the next cycle.

It will be evident that should the linkage 14 and piston 72 lose the normal phase relationship with respect to the crank and cam 100, the return travel of piston 72 will nevertheless terminate upon the opening of switch 105, caused by contact of the piston skirt with rod 103. The linkage 14 remains de-energized until cam 100 reaches that position in which switch 86 is closed, in the above example, the 15° after bottom-dead-center position. It is evident that by appropriate switch arrangements an analogous apparatus may be constructed, by those skilled in this art, such that the piston travel is centered about the bottom-dead-center crank position, rather than about the top-dead-center position, as in the foregoing example.

It will further be evident that instead of the switch means being operated by the driving member of crank, the switches will be especially convenient when the driving member and the power input portion of the linkage 14 move with a reciprocating motion. For example, a cam may be welded to the tube 20 to operate switch 86.

The embodiments of the invention in which a special property and privilege is claimed are defined as follows:

1. In a mechanism comprising a piston and a crank mechanically connected to said piston for imparting reciprocating motion to said piston, the improvement wherein said crank and piston are mechanically connected by a connecting link comprising a tube, a rod extending axially of said tube, a plunger member connected to said rod and disposed within said tube in spaced relationship therewith, a field-responsive fluid disposed in the space between said tube and plunger, means for guiding axial movement of said plunger with respect to said tube, the mutually remote ends of said rod and tube being attached to said crank and piston to mechanically connect said crank and piston, circuit means for applying a field of constant magnitude transversely of said space between said plunger and tube, and means responsive to the position of said crank for reducing the magnitude of said field during a portion of the cycle of said crank.

2. A mechanism for producing reciprocating motion of variable amplitude comprising a driving member for imparting reciprocating motion of constant amplitude, a driven member capable of reciprocating movement, a connecting link comprising a tube, a plunger disposed within said tube in spaced relationship therewith, means for guiding axial movement of said plunger with respect to said tube, and a field-responsive fluid disposed within the space between said plunger and said tube, the opposite ends of said plunger and tube being mechanically connected to said driving and driven members, first circuit means for applying a first field transversely of said space between said plunger and tube, second circuit means for applying a second field of lower amgnitude than said first field transversely of said space between said plunger and tube, and means responsive to the position of one of said driving and driven members for interrupting said first field during a portion of the cycle thereof.

3. An apparatus in accordance with claim 1 in which said crank is a drive member for imparting reciprocating motion to said reciprocating member.

4. An apparatus in accordance with claim 2 in which said driving member comprises a crank and the motion of said driven member is substantially rectilinear.

5. An apparatus according to claim 4 in which said first circuit means includes a source of electrical potential, and said means for interrupting said first field comprises a switch for disconnecting and reconnecting said source, said switch being actuated in response to the angular position of said crank.

6. An apparatus in accordance with claim 5 in which said switch and power source are serially connected in a closed circuit with a choke coil and a potentiometer to comprise said first circuit means.

7. An apparatus according to claim 5 including a cam driven by said crank, and means for supporting said switch in radially movable relationship with said cam, whereby movement of said switch changes the magnitude of the arc of rotation of said crank through which said first field is interrupted.

8. An apparatus in accordance with claim 7 in which said potential source is of variable voltage.

9. An apparatus in accordance with claim 7 including means for interrupting said first field in response to the movement of said reciprocating member to an extreme position of the travel thereof, said means permitting restoration of said field upon the next reconnection by said switch.

10. A mechanism for producing reciprocating motion of variable amplitude comprising a crank for imparting reciprocating motion of constant amplitude, a driven member capable of rectilinear reciprocating motion, a connecting link comprising a tube, a plunger member disposed within said tube in spaced relationship therewith, means for guiding axial movement of said plunger with respect to said tube, and a field-responsive fluid disposed in the space between said tube and plunger, the opposite ends of said tube and plunger being mechanically connected to said crank and driven member, a source of electric potential for applying a field transversely of said space between said plunger and tube, and means responsive to the position of said crank for interrupting said field during a portion of the cycle thereof comprising first switch means for providing an open circuit when said reciprocating member is at an extreme position of the travel thereof, but otherwise provide a closed circuit, second switch means connected in parallel with said first switch means for providing a closed circuit during the rotation of said crank from about a 0° position until after said first switch means next closes, but otherwise provide an open circuit, and third switch means for providing a closed circuit from a preselected point in the first 180° of rotation of said crank until after said first switch means next opens, but otherwise provide an open circuit, said third switch means, power source, and parallel first and second switch means being serially connected.

References Cited in the file of this patent

UNITED STATES PATENTS

| | | |
|---|---|---|
| 247,813 | Ericsson | Oct. 4, 1881 |
| 721,194 | Horn | Feb. 24, 1903 |
| 1,788,766 | Kelley | Jan. 13, 1931 |
| 2,661,596 | Winslow | Dec. 8, 1953 |
| 2,667,237 | Rabinow | Jan. 26, 1954 |
| 2,786,364 | Sawyer | Mar. 26, 1957 |
| 2,896,456 | Hagopian | July 28, 1959 |
| 2,912,530 | Frachon | Nov. 10, 1959 |
| 2,981,116 | Scholin | Apr. 25, 1961 |

FOREIGN PATENTS

| | | |
|---|---|---|
| 704,084 | Great Britain | Feb. 17, 1954 |

UNITED STATES PATENT OFFICE
CERTIFICATE OF CORRECTION

Patent No. 3,139,760            July 7, 1964

Paul E. Pfeifer

It is hereby certified that error appears in the above numbered patent requiring correction and that the said Letters Patent should read as corrected below.

Column 1, line 53, for "thmeselves" read -- themselves --; column 7, line 32, for "amgnitude" read -- magnitude --; line 37, for the claim reference numeral "1" read -- 2 --; line 38, strike out "crank is a"; same line 38, for "drive" read -- driving --; same column 7, line 38, after "member" insert -- is a crank --.

Signed and sealed this 19th day of January 1965.

(SEAL)
Attest:

ERNEST W. SWIDER            EDWARD J. BRENNER
Attesting Officer            Commissioner of Patents